United States Patent [19]

Branlard et al.

[11] 3,984,609

[45] *Oct. 5, 1976

[54] PROCESS FOR THE INSTANTANEOUS PEPTIZATION OF POLYCHLOROPRENE LATEX

[75] Inventors: Paul Branlard, Grenoble; Jacques Modiano, Varces, both of France

[73] Assignee: Distugil, Grenoble, France

[ * ] Notice: The portion of the term of this patent subsequent to Apr. 30, 1991, has been disclaimed.

[22] Filed: Apr. 29, 1974

[21] Appl. No.: 465,436

Related U.S. Application Data

[63] Continuation of Ser. No. 159,536, July 2, 1971, abandoned.

[30] Foreign Application Priority Data

July 10, 1970 France .............................. 70.26729

[52] U.S. Cl............................. 526/78; 260/29.7 SQ; 526/204; 526/205; 526/206; 526/214; 526/222; 526/224; 526/295

[51] Int. Cl.² ..................... C08D 1/09; C08D 1/36; C08D 3/14

[58] Field of Search .............. 260/29.7 SQ; 526/78, 526/204, 205, 206, 214, 222, 224, 295

[56] References Cited
UNITED STATES PATENTS

| | | | |
|---|---|---|---|
| 2,234,204 | 3/1941 | Starkweather | 260/92.3 |
| 2,234,211 | 3/1941 | Walker | 260/92.6 |
| 2,234,215 | 3/1941 | Youker | 260/92.3 |
| 2,264,173 | 11/1941 | Collins | 260/92.3 |
| 3,318,832 | 5/1967 | Sparks | 260/29.6 |
| 3,397,173 | 8/1968 | Collette | 260/45.9 |
| 3,808,183 | 4/1974 | Branlard | 260/92.3 |

FOREIGN PATENTS OR APPLICATIONS

| | | | |
|---|---|---|---|
| 1,035,387 | 7/1966 | United Kingdom | 260/92.3 |

*Primary Examiner*—Christopher A. Henderson, Jr.
*Attorney, Agent, or Firm*—Browdy and Neimark

[57] ABSTRACT

A process for instantaneous peptization of polychloroprene latexes made by polymerizing in the presence of sulfur and a modifying agent such as iodoform or a dialkylxanthogen disulfide, by adding a suitable thiol at a pH at least equal to 9.

12 Claims, No Drawings

PROCESS FOR THE INSTANTANEOUS PEPTIZATION OF POLYCHLOROPRENE LATEX

This is a continuation of application Ser. No. 159,536, filed July 2, 1971, now abandoned.

The present invention relates to a process for instantaneous peptisation of sulfur-modified polychloroprene latexes and new polychloroprene polymers obtained by such a process.

The sulfur-modified chloroprene latexes, according to the invention, are those obtained by aqueous solution polymerization of 2-chloro-butadiene-1,3 alone or in the presence of one or more copolymerizable monomers, in the presence of sulfur and of a modifying agent that can be for example iodoform or a dialkylxanthogen disulfide of the formula:

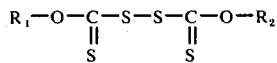

in which $R_1$ and $R_2$ are alkyl groups containing from 1 to 8 carbon atoms. Preferred dialkylxanthogen disulfides are those in which $R_1$ and $R_2$ are alkyl groups containing from 3 to 4 carbon atoms such as diisopropylxanthogen disulfides.

Latex peptisation such as is done according to the present invention can be defined as a partial or a complete dissociation of sulfur-modified polychloroprenes so as to provide more plastic products.

The principle of such a peptisation is well known. It has been described in British Pat. No. 529.838 of Apr. 24, 1939 and French Pat. Nos. 1,376,314 of Dec. 5, 1963 and 1,393,099 of May 13, 1954. However, the processes used require the latex to be treated for several hours in the presence of tetraalkylthiuram disulfide mixed with a dialkyl ammonium dithiocarbamate of dialkyl at a temperature range of about 40°C. Besides, the process of manufacture itself is very difficult because the peptisation reaction which is slow is carried on during treatment of the latex so as to remove residual monomer and during rubber isolation phase. Moreover the plasticity of the rubbers so obtained varies with time, after peptisation treatment properly so called, which constitutes a serious drawback for their use and their transformation into manufactured products.

An object of the present invention is to provide a process for the instantaneous peptisation of sulfur-modified polychloroprene latexes by treating such latexes having a pH at least equal to 9 with a thiol having a marked destructive ability towards the polysulfides linkages. One such thiol has the general formula R—SH or its ionized sulfenyl form : $RS^-Me^+$ (Me being an alkali cation or ammonium) in which R may be as follows:

an alkyl group containing from 2 to 16 carbon atoms, the chain of which is straight or branched, such as n-octylmercaptan, n-dodecylmercaptan, amylmercaptan, t-butylmercaptan. The mercaptan can also consist of a mixture of alkylmercaptans having different alkyl groups.

an aryl or alkylaryl group such as thiophenol;

an arylcarbonyl group such as thiobenzoic and p-mercaptobenzoic acid;

an alkylcarboxy group such as mercaptosuccinic acid;

an alkylnaphthyl or naphthyl group such as thio-$\beta$-naphthol;

an arylthiazole or thiazole group such as mercaptobenzothiazole or its sodium salt;

an arylimidazole or imidazole group such as mercaptobenzimidazole;

an alkylxanthate such as sodium isopropylxanthate.

These products can be introduced into the polychloroprene latex either in a pure state or in a solution or emulsion in a carrying liquid such as chloroprene or water or a mixture of these two compounds.

The principle of adding such compounds to latexes is already known. But in the processes known at the present time, the purpose of this addition and the function of the additives are essentially different from those of the present invention.

As a matter of fact, in the prior art, mercaptans added at the beginning of polymerization are used as chain transfer agents during polymerization but have no action on chains already polymerized. Other additives according to the invention, are known to be classical vulcanization agents.

On the other hand applicant has discovered surprisingly that the addition of such additives into sulfur-modified polychloroprene latexes, under determined pH conditions, generates a new function which is an instantaneous real peptisation by breaking polymers chains already formed, on a level with polysulfide chains, this leading to more plastic polymers. Analysis of the phenomena has shown that this immediate peptisation is effected by the direct attack of the polysulfide bonds by the sulfenyl radical $RS^-$ without which there would be a reaction of the peptisation agent with the residual modifying agent or their decomposition products. The sulfenyl anions have a marked action whatever may be the modifying agent used and which is active even in the absence of the modifying agent. The analysis of the dialkylxanthogen disulfide in the course of the polymerization has shown that this agent almost disappeared when polymerization stopped thus it cannot be a reaction between this agent and the peptising sulfenyl agent. In the same way iodoform does not react upon the sulfenyl groups and phenomena analysis has shown that the peptising agent reacts by breaking di- or polysulfides bonds present in the polymer. It has been proved by the marked decrease of the polymer gel ratio after the polymer has been attacked, in the absence of a chain transfer agent. This peptising action of the above cited thiols is the greater as the ratio of the sulfur combined with the polymer is greater.

Thereby the addition of such products so as to provide a maximum efficiency is done preferentially just at the end of polymerization. However, this addition can be effected during polymerization when the reaction has progressed enough and has already consumed the greatest part of the sulfur. The polymer formed is peptised instantaneously. But the progress of the polymerization is greatly slowed down. Thus there is a practical reason for adding this thiol just at the end of polymerization.

The modification of the Mooney viscosity of the latex is immediate and independent of the temperature in the range of from 5° to 80°C. It depends upon pH at the time of peptisation, having a minimal value of 9, and the preferred pH of from 11 to 13. This Mooney viscosity is effective on the latex, whether the residual monomer is eliminated or not.

The proportion of thiol is from 0.05 to 10 millimoles per mole of initial chloroprene monomer added. This proportion depends on the desired plasticity of the polymer so prepared, but also on the proportion of sulfur and dialkylxanthogen disulfide used in the reaction. The proportion of sulfur can vary from 0.01 to 2% by weight based on the chloroprene added. The proportion of modifying agent is from 0.5 to 4 millimoles per mole of chloroprene for dialkylxanthogen disulfide and from 0.1 to 4 millimoles per mole of chloroprene for iodoform.

Owing to the fact that peptising action is immediate and thorough, the Mooney viscosity of the polychloroprene does not develop further during manufacture treatment, which provides the advantage of easily preparing these rubbers having very reproducible Mooney viscosities.

Then the polymer can be isolated according to any known manner, for example by vapor entrainment of the latex under reduced pressure so as to remove the residual monomer, then by coagulation by cooling and drying in an oven having air circulation.

Sulfur- and dialkylxanthogen disulfide- and iodoform-modified polychloroprene rubbers are peptised instantaneously, according to the invention, and have a Mooney viscosity which allow their treatment in usual rubber apparatus without the need for a peptisation step of the solid rubber during the mixing by addition of an appropriate peptising agent such as tetraethylthiuram disulfide alone or mixed with diphenylguanidine. Although such a treatment is not necessary, it is possible.

These rubbers have very good storage properties, better than those of sulfur-modified polychloroprene rubbers already known, and can be improved by an antioxidant addition. The antioxidant is preferably added to the latex in emulsion or dispersion form. Non soiling phenolic antioxidants such as 2,6-ditertiarybutyl-p-cresol, 4-4' butylidene-bis (6-t-butyl-m-cresol), 4-4'-thio-bis-(3-methyl-6-t-butylphenol), 2-5'-di-t-amylhydroquinone are particularly suitable for polychloroprene protection.

These rubbers also have very good mechanical properties, better than those of sulfur- or dialkylxanthogen disulfide-modified polychloroprenes which have not been peptised in a latex state during their manufacture. An increase ranging from 10 to 20% of tensile and tearing strengths is noted. Thereby they have the important property of being reduced on mixing machines during their use without the necessity of adding a peptising agent. Moreover the absence of thiurams in these sulfur-modified rubbers permits the manufacturer a large choice of vulcanization systems, allowing these rubbers to be used in different ways, the more so because this process results in a Mooney viscosity range generally used: from 20 to more than 150 and a crystallization rates range of polychloroprene.

Instantaneously peptised polymers having too high Mooney viscosities, can be treated during their use by peptising agents that react on dry rubber. Thus, desirable Mooney viscosity ranges can be obtained.

The following examples illustrate the present invention in which indications of arts and percentage are by weight, but are not limiting thereof.

EXAMPLE 1

A sulfur-modified polychloroprene latex is prepared by the following aqueous emulsion composition:

|  |  | Parts by weight |
|---|---|---|
| Monomer phase | - Chloroprene | 100 |
|  | - Disproportionated resinous acid | 4.0 |
|  | - Sulfur | 0.35 |
|  | - Diisopropylxanthogen disulfide | 0.40 |
| Aqueous phase | - Deaerated water | 150 |
|  | - Sodium hydroxide | 0.8 |
|  | - Distabex LS (Trade mark of Societe Francaise des Matieres Colorantes, polymerized organic sulfonic salts) | 0.7 |
|  | - Anhydrous trisodium phosphate | 0.3 |
| Catalyst solution: | - Potassium persulfate  0.052 | total added quantity |
|  | - Deaerated water  3.51 |  |

Polymerization is effected at 45°C. under an ammonia atmosphere at a pH of 12.9 and the catalyst solution is added continuously to give a uniform polymerization rate. The polymerization is stopped when about 85% of the monomer has been polymerized by adding 0.01 part of p-tert-butyl catechol and 0.01 part of phenothiazine in an emulsion. 0.35 part of pure n-dodecyl-mercaptan is introduced into the latex as soon as the polymerization has stopped, the latex being under stirring. Then it is cooled and treated with steam to remove the residual chloroprene. After polymer isolation, Mooney consistency ML 1 + 4 at 100°C. gives the value 46. The polymer obtained in the same manner but without the mercaptan addition, has a Mooney viscosity equal to 100.

EXAMPLE 2

Sulfur-modified polychloroprene latexes are prepared with the aqueous emulsion of Example 1 to which the following modifications were made:

Table 1

| Reference polychloroprene | Sulfur | Diisopropylxanthogen disulfide | n-dodecylmercaptan | Mooney viscosity ML 1 + 4 at 100°C. | Polymerization temp. (°C.) |
|---|---|---|---|---|---|
| I | 0.10 | 0.60 | 0.10 | 46 | 45 |
| II | 0.35 | 0.45 | 0.25 | 41 | 45 |
| III | 0.60 | 0.25 | 0.70 | 38 | 45 |
| IV | 0.10 | 0.60 | 0.70 | 49 | 45 |
| V | 0.35 | 0.25 | 0.80 | 41 | 45 |
| VI | 0.35 | 0.425 | 0.30 | 40 | 30 |
| VII | 0.10 | 0.525 | 0.65 | 49 | 30 |
| VIII | 0.10 | 0.77 | 0.10 | 41 | 60 |
| IX | 0.2 | 0.475 | 0.65 | 42 | 45 |
| X | 0.35 | 0.425 | 0.30 | 45 | 20 |

Corresponding Mooney viscosities, obtained on the same polymers prepared without the addition of peptisation agents ranged from 120 to 80.

Polychloroprenes prepared as described above are odorless, have a pale color and after mixing have the properties mentioned in Table II, this being after vulcanization by the following formula:

|  | Parts by weight |
|---|---|
| Polychloroprene rubber | 100 |
| Lightly calcined magnesia | 4 |
| Stearic acid | 0.5 |
| Phenylbetanaphthylamine | 2 |
| Carbon Black "STERLING V" | 29 |
| 2-mercapto imidazoline | 0.5 |
| Zinc oxide | 5 |
| Dibenzothiazyle disulfide | 0.5 |

Table II

Vulcanizates properties (after 40 minutes of vulcanization at 153°C.)

| Polychloroprene reference | rupture strength (kg/cm$^2$) | Modulus at 300% of elongation (kg/cm$^2$) | Tearing strength kg/cm$^2$ [1] | Increase of IRH hardness at −5°C. after remaining for | | |
|---|---|---|---|---|---|---|
| | | | | 1 day | 3 days | 14 days |
| I | 243 | 122 | 68.5 | 0 | | 29 |
| II | 233 | 123 | 62.5 | 0 | 2 | 30 |
| III | 213 | 106 | 61.5 | 1 | 3 | 30 |
| IV | 233 | 105 | 64.5 | 7 | 22 | 28 |
| V | 235 | 112 | 69 | 1 | 22 | 31 |
| VI | 238 | 125 | 65 | 2 | 24 | |
| VII | 245 | 111 | 64 | 28 | 33 | |
| VIII | 220 | 125 | 65 | 0 | 0 | 2 |
| IX | 235 | 88 | 61 | 6 | 24 | |
| X | 251 | 130 | 67.5 | 34 | | |

[1] according to U.S. standard ASTM D 624-54 sample B

| Reference polychloroprene | Mooney viscosity (ML 1 + 4 at 100°C.) | Rupture strength (kg/cm$^2$) | Modulus at 300% of elongation (kg/cm$^2$) | tearing strength kg/cm [1] | Increase of IRH hardness at −5°C. | |
|---|---|---|---|---|---|---|
| | | | | | 1 day | 14 days |
| XIII | 39 | 229 | 133 | 59 | 1 | 31 |
| XIV | 38 | 239 | 135 | 56 | 1 | 30 |
| XV | 42 | 233 | 127 | 59 | 0 | 25 |

[1] according to U.S. standard ASTM 624-54 sample B

EXAMPLE 3

Sulfur-modified polychloroprene latexes are prepared with the aqueous emulsion of example 1 to which the following modifications have been made:

| Modifications | Polymers | |
|---|---|---|
| | XI | XII |
| Diisopropylxanthogen disulfide | 0.350 | 0.425 |
| n-octylmercaptan | 0.300 | 0.225 |

Properties measured according to Example II are:

| Reference Polychloroprene | Mooney viscosity (ML 1 + 4 at 100°C.) | Rupture Strength (kg/cm$^2$) | Modulus at 300% of elongation (kg/cm$^2$) | Tearing strength (Kg/cm$^2$) [1] | Increase of IRH hardness at −5°C. after remaining for: | | |
|---|---|---|---|---|---|---|---|
| | | | | | 1 day | 3 days | 14 days |
| XI | 59 | 235 | 108 | 67 | 1 | 12 | 30 |
| XII | 48 | 233 | 110 | 62.5 | 1 | 4 | 25 |

[1] according to U.S. standard ASTM D 624-54 sample B

EXAMPLE 4

Sulfur-modified polychloroprene latexes are prepared with the aqueous emulsion of Example 1 to which the following modifications have been made:

| MODIFICATIONS | POLYMERS | | |
|---|---|---|---|
| | XIII | XIV | XV |
| Diisopropylxanthogen disulfide | 0.450 | 0.450 | 0.450 |
| n-dodecylmercaptan | 0.400 | 0.200 | 0.400 |
| Conversion ratio to which the mercaptan is added to the latex | 45% | 84% | 16% |
| Conversion ratio at the polymerization end | 85% | 85% | 85% |

The measured properties are as follows:

EXAMPLE 5

A latex is prepared under the same conditions as in example 1, but with 0.425 parts of diisopropylxanthogen disulfide. When polymerization stops 1.5 parts of thiobenzoic acid are added. The latex is then cooled and steam-treated to remove residual chloroprene. After isolation of the polymer, measuring of Mooney consistency ML 1 + 4 at 100°C. gives the value 46.

After having vulcanized by the formula of example 2, for 40 minutes at 153°C. the following vulcanizate properties were measured:

| Rupture strength kg/cm$^2$ | Modulus at 300% of elongation kg/cm$^2$ | Tearing strength kg/cm | Increase of IRH hardness at −5°C. after remaining for: | |
|---|---|---|---|---|
| | | | 1 day | 3 days |
| 231 | 132 | 61 | 1 | 3 |

EXAMPLE 6

A latex is prepared under the same conditions as in example 1, by using 0.425 parts of diisopropylxanthogen disulfide. When polymerization stops, 0.5 parts of the sodium salt of mercaptobenzothiazole are added.

Then the latex is cooled and steam-treated so as to remove residual chloroprene. After isolating the polymer, measuring of Mooney consistency ML 1 + 4 at 100°C. gives the value 39.

After having vulcanized by the formula of Example 2, for 40 minutes at 153°C., the following vulcanizate properties were measured:

| Rupture strength kg/cm² | Modulus at 300% of elongation kg/cm² | Tearing strength kg/cm | Increase IRH hardness at −5°C. after remaining for: | | |
|---|---|---|---|---|---|
| | | | 1 day | 3 days | 14 days |
| 235 | 130 | 63 | 1 | 4 | 26 |

EXAMPLE 7

A latex is prepared under the same conditions as in Example 1, but with 0.10 part of sulfur and 0.55 part of diisopropylxanthogen disulfide. Polymerization is conducted at 40°C. When polymerization stops, 0.10 part of the sodium salt of mercaptobenzothiazole is added. Then the latex is cooled and steam-treated so as to remove residual chloroprene. After polymer isolation, measuring of Mooney consistency ML 1 + 4 at 100°C. gives the value 51. The polymer obtained in the same manner, but without an addition of sodium mercaptobenzothiazole salt has a Mooney viscosity of 80 under the same conditions of measuring.

After having vulcanized by the formula of example 2, for 40 minutes at 153°C., the following vulcanizate properties were measured:

| Rupture strength kg/cm² | Modulus at 300% of elongation kg/cm² | Tearing strength kg/cm | Increase of IRH hardness at −5°C. after remaining for: | |
|---|---|---|---|---|
| | | | 1 day | 3 days |
| 250 | 120 | 69 | 4 | 22 |

EXAMPLE 8

Sulfur-modified polychloroprene latexes are prepared by means of the aqueous emulsion of example 1 to which the following modifications have been made:

| POLYMERS | XVI | XVII | XVIII |
|---|---|---|---|
| Conversion ratio (%) | 70 | 75 | 80 |
| Polymerization temperature (°C.) | 40 | 40 | 40 |
| Sulfur (parts/100 parts by weight of chloroprene) | 0.1 | 0.1 | 0.1 |
| Diisopropylxanthogen disulfide (p/100 parts by weight of chloroprene) | 0.5 | 0.6 | 0.6 |
| Sodium salt of mercaptobenzothiazole* (p/100 parts by weight of chloroprene) | 0.2 | 0.2 | 0.2 |

*introduced into the latex just after the end of polymerization.

Mechanical properties of rubbers prepared by isolation of such latexes are excellent and vary according to conversion ratio, as is shown in the following table (after having vulcanized for 40 minutes at 153°C., with the formula of Example 2).

| Polychloroprene reference | Mooney viscosity (ML 1 + 4 at 100°C.) | Rupture strength kg/cm² | Modulus at 300% of elongation kg/cm² | Tearing strength kg/cm² | Swelling at the exit of the drawing plate % |
|---|---|---|---|---|---|
| XVI | 41 | 262 | 121 | 70 | 105 |
| XVII | 42 | 255 | 110 | 70 | 115 |
| XVIII | 40 | 253 | 113 | 70 | 125 |

EXAMPLE 9

Sulfur-modified polychloroprene latexes are prepared by means of the aqueous emulsion of Example 1 to which the following modification are made:

Diisopropylxanthogen disulfide is replaced by iodoform and n-dodecyl-mercaptan by the sodium salt of mercaptobenzothiazole:

| POLYMERS | XIX | XX |
|---|---|---|
| Conversion ratio (%) | 70 | 70 |
| Polymerization temperature (°C.) | 40 | 40 |
| Sulfur (p/100 parts by weight of chloroprene) | 0.1 | 0.35 |
| Iodoform (p/100 parts by weight of chloroprene) | 0.2 | 0.2 |
| Sodium salt of mercaptobenzothiazole* (p/100 parts by weight of chloroprene) | 0.2 | 0.2 |

*introduced into the latex just after the end of polymerization.

Properties of these rubbers measured after having vulcanized by the formula of example 2 for 40 min. at 153°C., are shown in the following table:

| Polychloroprene reference | Mooney viscosity (ML 1 + 4 at 100°C.) | Rupture strength (kg/cm²) | Modulus at 300% of elongation kg/cm² | Tearing Strength (kg/cm²) | Increaase of IRH hardness at −5°C. after remaining for | |
|---|---|---|---|---|---|---|
| | | | | | 1 day | 3 days |
| XIX | 50 | 245 | 100 | 66 | 17 | 30 |
| XX | 60 | 240 | 114 | 70 | 3 | 28 |

Mooney viscosities of polymers XIX and XX measured before adding the sodium salt of mercaptobenzothiazole are respectively equal to 65 and 85.

EXAMPLE 10

Sulfur-modified polychloroprene latexes are prepared by means of the aqueous emulsion of example 1 to which the following modifications have been made: n-dodecylmercaptan is replaced by the following peptising agents.

| Peptising agent | Amount introduced (p/100 parts by weight of chloroprene) | Mooney viscosity (ML 1 + 4 at 100°C.) |
|---|---|---|
| Sodium isopropyl-xanthate | 1 | 71 |
| 2-mercapto-benzimidazole | 1 | 67 |
| thiol benzene | 0.5 | 17 |
| Sodium mercapto succinate | 1 | 76 |
| Thio-2 naphtol | 0.5 | 20 |

It will be obvious to those skilled in the art that various changes may be made without departing from the scope of the invention and the invention is not to be considered limited to what is described in the specification.

What is claimed is:

1. A process for the instantaneous peptization of polychloroprene latexes, comprising polymerizing the chloroprene monomer in the presence of sulfur and a modifying agent selected from the group consisting of iodoform and the dialkylxanthogen disulphides, and peptizing the latexes at a pH at least equal to 9, by adding a thiol of the general formula R—SH or its ionized sulfenyl form $RS^-Me^+$, Me being an alkali cation or ammonium, in which R is:

- an alkyl group containing from 2 to 16 carbon atoms, the chain of which is straight or branched, or a mixture of different alkyl groups;
- an aryl or alkylaryl group;
- an arylcarbonyl group;
- an alkylcarboxy group;
- an alkylnaphthyl or naphthyl group;
- an arylthiazole or thiazole group or its sodium salt;
- an arylimidazole or imidazole group; or
- an alkylxanthate group.

2. A process according to claim 1 wherein the thiol addition is conducted at the end of the polymerization.

3. A process according to claim 1 wherein the pH is from 11 to 13.

4. A process according to claim 1 wherein the ratio of thiol added is from 0.05 to 10 millimoles per mole of chloroprene monomer.

5. A process according to claim 1 wherein the ratio of sulfur added is from 0.01% to 2% by weight based on the chloroprene monomer.

6. A process according to claim 1 wherein dialkylxanthogen disulfide is the modifying agent added in a ratio of 0.5 to 4 millimoles per mole of chloroprene monomer.

7. A process according to claim 1 wherein the thiol is thiobenzoic or p-mercaptobenzoic acid.

8. A process according to claim 1 wherein the thiol is mercaptobenzothiazole or its sodium salt.

9. A process in accordance with claim 1 wherein said modifying agent is iodoform.

10. The product produced by the process of claim 4.

11. A process according to claim 9 wherein iodoform is the modifying agent added in a ratio of from 0.1 to 4 millimoles per mole of chloroprene monomer.

12. A process in accordance with claim 1 wherein said modifying agent is diisopropylxanthogen disulfide.

* * * * *

UNITED STATES PATENT AND TRADEMARK OFFICE
CERTIFICATE OF CORRECTION

PATENT NO. : 3,984,609
DATED : October 5, 1976
INVENTOR(S) : Paul Branlard et al It is certified that error appears in the above-identified patent and that said Letters Patent are hereby corrected as shown below:

Title page, [63], delete "abandoned" and insert
--now Patent No. 3,808,183--

Column 1, line 5, delete "now abandoned" and insert
--now Patent No. 3,808,183--

Signed and Sealed this

Fourth Day of January 1977

[SEAL]

Attest:

RUTH C. MASON
*Attesting Officer*

C. MARSHALL DANN
*Commissioner of Patents and Trademarks*